US009796205B2

(12) United States Patent
Lau et al.

(10) Patent No.: US 9,796,205 B2
(45) Date of Patent: Oct. 24, 2017

(54) LUMINESCENT PHOSPHOR COMPOUNDS, ARTICLES INCLUDING SUCH COMPOUNDS, AND METHODS FOR THEIR PRODUCTION AND USE

(71) Applicant: Honeywell International Inc., Morristown, NJ (US)

(72) Inventors: Carsten Lau, Garbsen (DE); James Kane, Lawrenceville, NJ (US); William Ross Rapoport, Bridgewater, NJ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 196 days.

(21) Appl. No.: 14/717,855

(22) Filed: May 20, 2015

(65) Prior Publication Data

US 2015/0252256 A1 Sep. 10, 2015

Related U.S. Application Data

(62) Division of application No. 13/538,745, filed on Jun. 29, 2012, now abandoned.

(60) Provisional application No. 61/508,295, filed on Jul. 15, 2011.

(51) Int. Cl.
| | | |
|---|---|---|
| *C09K 11/08* | (2006.01) | |
| *B42D 25/36* | (2014.01) | |
| *B42D 25/373* | (2014.01) | |
| *C09K 11/77* | (2006.01) | |
| *B41M 3/14* | (2006.01) | |
| *B42D 25/29* | (2014.01) | |
| *B42D 25/00* | (2014.01) | |
| *B42D 25/387* | (2014.01) | |
| *B42D 25/382* | (2014.01) | |

(52) U.S. Cl.
CPC .......... *B42D 25/373* (2014.10); *B41M 3/144* (2013.01); *B42D 25/00* (2014.10); *B42D 25/29* (2014.10); *B42D 25/36* (2014.10); *B42D 25/387* (2014.10); *C09K 11/08* (2013.01); *C09K 11/77* (2013.01); *C09K 11/7774* (2013.01); *B42D 25/382* (2014.10); *Y10T 428/2958* (2015.01); *Y10T 428/31993* (2015.04); *Y10T 442/20* (2015.04)

(58) Field of Classification Search
CPC ...... B42D 25/373; B42D 25/00; B42D 25/29; B42D 25/36; B42D 25/387; B42D 25/382; B41M 3/144; C09K 11/08; C09K 11/77; C09K 11/7774; Y10T 428/2958; Y10T 428/31993; Y10T 442/20
See application file for complete search history.

(56) References Cited

U.S. PATENT DOCUMENTS

| | | |
|---|---|---|
| 3,623,996 A | 11/1971 | Amster |
| 3,639,932 A | 2/1972 | Ferri et al. |
| 3,673,102 A | 6/1972 | Lehmann et al. |
| 4,152,483 A | 5/1979 | Kanda et al. |
| 4,387,112 A | 6/1983 | Blach |
| 4,442,170 A | 4/1984 | Kaule et al. |
| 4,446,204 A | 5/1984 | Kaule et al. |
| 4,451,530 A | 5/1984 | Kaule et al. |
| 4,500,116 A | 2/1985 | Ferro et al. |
| 5,424,006 A | 6/1995 | Murayama et al. |
| 5,569,317 A | 10/1996 | Sarada et al. |
| 5,891,361 A | 4/1999 | Kane |
| 5,949,539 A | 9/1999 | Britton, Jr. et al. |
| 5,986,272 A | 11/1999 | Britton, Jr. et al. |
| 6,043,602 A | 3/2000 | Sun et al. |
| 6,072,198 A | 6/2000 | Sun et al. |
| 6,132,642 A | 10/2000 | Kane |
| 6,146,773 A | 11/2000 | Kaule |
| 6,344,261 B1 | 2/2002 | Kaule et al. |
| 6,479,133 B1 | 11/2002 | Kaule et al. |
| 6,503,603 B1 | 1/2003 | Kaule et al. |
| 6,696,782 B2 | 2/2004 | Imamura et al. |
| 7,068,700 B2 | 6/2006 | Rapoport et al. |
| 7,415,052 B2 | 8/2008 | Rapoport et al. |
| 7,531,108 B2 | 5/2009 | Hampden-Smith et al. |
| 8,759,794 B2 | 6/2014 | Rapoport et al. |
| 2004/0031931 A1 | 2/2004 | Mueller et al. |
| 2007/0295116 A1 | 12/2007 | Le Mercier et al. |
| 2008/0252066 A1 | 10/2008 | Rapoport et al. |
| 2009/0007815 A1 | 1/2009 | Hampden-Smith et al. |
| 2009/0141961 A1 | 6/2009 | Smith et al. |
| 2009/0159510 A1 | 6/2009 | Haushalter et al. |
| 2009/0194740 A1 | 8/2009 | Heo et al. |

FOREIGN PATENT DOCUMENTS

| | | |
|---|---|---|
| CN | 1323439 | 11/2001 |
| CN | 101014683 | 8/2007 |

(Continued)

OTHER PUBLICATIONS

International Search Report mailed Nov. 23, 2012 in International Application No. PCT/US2012/046381.

*Primary Examiner* — Carol M Koslow
(74) *Attorney, Agent, or Firm* — Lorenz & Kopf, LLP (57) ABSTRACT

Embodiments include luminescent phosphor compounds that include one or more emitting ions and one or more disturbing ions, and methods for their production. An emitting ion in the compound may be characterized by a first decay time constant when the emitting ion is undisturbed. However, a corresponding disturbing ion in the compound, which is different from the emitting ion, causes the emitting ion to have a pre-defined, target disturbed decay time constant that is greater than zero and less than the first decay time constant. An embodiment of an authentication system is configured to measure the decay time constant of a phosphor compound applied to an article, and to determine whether the decay time constant corresponds to a phosphor compound that includes a particular disturbing ion (e.g., in order to determine whether or not the article is authentic).

17 Claims, 4 Drawing Sheets

(56) References Cited

FOREIGN PATENT DOCUMENTS

| EP | 825161 A1 | | 2/1998 |
|----|-----------|---|--------|
| WO | 9938702 | | 8/1999 |
| WO | 2011002960 A1 | | 1/2011 |
| WO | WO 2011/002960 | * | 1/2011 |

* cited by examiner

LUMINESCENT PHOSPHOR COMPOUNDS, ARTICLES INCLUDING SUCH COMPOUNDS, AND METHODS FOR THEIR PRODUCTION AND USE

CROSS-REFERENCE TO RELATED APPLICATIONS

This application is a divisional of U.S. application Ser. No. 13/538,745, filed Jun. 29, 2012, which claims the benefit of U.S. Provisional Application Ser. No. 61/508,295, filed Jul. 15, 2011.

TECHNICAL FIELD

The present invention generally relates to radiation emitting compounds, articles including such compounds, and methods for their production and use and, more particularly relates to luminescent phosphor compounds, articles including such compounds as authentication features, and methods for their production and use.

BACKGROUND

A luminescent phosphor compound is a compound that is capable of emitting detectable quantities of radiation in the infrared, visible, and/or ultraviolet spectrums upon excitation of the compound by an external energy source. A typical luminescent phosphor compound includes at least a host crystal lattice, an emitting ion (e.g., of a rare earth metal), and in some cases, a "sensitizing" ion (e.g., of a transition metal or of a different rare earth metal that can absorb and transfer the energy to the emitting rare earth metal ion). The production of radiation by a phosphor compound is accomplished by absorption of incident radiation by the emitting ion(s) or by either or both the host crystal lattice and the sensitizing ion(s), energy transfer from the host crystal lattice/sensitizing ion(s) to the emitting ion(s), and radiation of the transferred energy by the emitting ion(s).

The selected components of a phosphor compound cause the compound to have particular properties, including specific wavelengths for its excitation energy ("exciting radiation"), and specific spectral position(s) for peak(s) in energy emitted by the emitting ions of the phosphor compound ("emitted radiation"). Not every ion will have emission in all host crystal lattices. There are many examples in which radiation that has the potential for emission is quenched or the energy transfer from the absorbing ions or the host crystal lattice to the emitting ions is so poor that the radiation effects are barely observable. In other host crystal lattices, the radiation effects can be very large and with quantum efficiency near unity.

For a specific phosphor compound that does produce observable emitted radiation, the spectral position(s) of the peak(s) in its emitted radiation (i.e., its "spectral signature") may be used to uniquely identify the phosphor compound from different compounds. Primarily, the spectral signature is due to the rare earth ion(s). However, spectral perturbations may be present due to the influence of the host crystal lattice on the various ions, typically through crystal field strength and splitting. This holds true for the temporal behavior of the emitted radiation, as well.

The unique spectral properties of some phosphor compounds make them well suited for use in authenticating or identifying articles of particular value or importance (e.g., banknotes, passports, biological samples, and so on). Accordingly, luminescent phosphor compounds with known spectral signatures have been incorporated into various types of articles to enhance the ability to detect forgeries or counterfeit copies of such articles, or to track and identify the articles. For example, luminescent phosphor compounds have been incorporated into various types of articles in the form of additives, coatings, and printed or otherwise applied authentication features.

An article that includes a luminescent phosphor compound may be authenticated using specially designed authentication equipment. More particularly, a manufacturer may incorporate a known phosphor compound into its "authentic" articles. Such a phosphor compound may be referred to as an "authenticating" phosphor compound (i.e., a phosphor compound having known spectral and possibly known temporal properties, as well as particular excitation conditions, which is used for identification and/or authentication purposes). Authentication equipment configured to detect the authenticity of such articles would have knowledge (e.g., stored information) of the wavelengths of absorbable exciting radiation and the spectral properties of emitted radiation associated with the authenticating phosphor compound. When provided with a sample article for authentication, the authentication equipment exposes the article to exciting radiation having wavelengths that correspond with the known wavelengths of absorption features of the luminescent phosphor that lead directly or indirectly to the desired emitted radiation. The authentication equipment senses and characterizes the spectral parameters for any emitted radiation that may be produced by the article. When the spectral signal of detected emitted radiation is within the authenticating parameter range of the detection apparatus that corresponds with the authenticating phosphor compound (referred to as the "detection parameter space"), the article may be considered authentic. Conversely, when the authentication equipment fails to sense signals expected within the detection parameter space, the article may be considered unauthentic (e.g., a forged or counterfeited article).

The above-described techniques are highly-effective at detecting and thwarting relatively unsophisticated forgery and counterfeiting activities. However, individuals with the appropriate resources and equipment may be able to reverse engineer an authentication system and/or to employ spectrometry techniques in order to determine the components of some phosphor compounds. The phosphor compounds may then be reproduced and applied to unauthentic articles, thus compromising the authentication benefits that may otherwise be provided by a particular phosphor compound. Accordingly, although a number of phosphor compounds have been developed to facilitate article authentication in the above-described manner, it is desirable to develop additional compounds and techniques for authenticating articles, which may render forgery and counterfeiting activities more difficult, and/or which may prove beneficial for identifying and tracking articles of particular interest. Furthermore, other desirable features and characteristics of the present invention will become apparent from the subsequent detailed description of the invention and the appended claims, taken in conjunction with the accompanying drawings and this background of the invention.

BRIEF SUMMARY

An embodiment of a luminescent phosphor compound includes an emitting ion and a disturbing ion that is different from the emitting ion and optionally a sensitizing ion. The emitting ion has a first decay time constant when the emitting ion is undisturbed. The disturbing ion causes the emitting ion to have a pre-defined, disturbed decay time constant that is greater than zero and less than the first decay time constant.

Another embodiment includes a luminescent phosphor compound for security applications, which includes one or more emitting ions and one or more disturbing ions. The one or more emitting ions have one or more first decay time constants when the one or more emitting ions are undisturbed. The one or more disturbing ions are different from the one or more emitting ions, and the one or more disturbing ions are included in the phosphor compound in a quantity that will cause at least one of the one or more emitting ions to have a pre-defined, target disturbed decay time constant that is greater than zero and less than a corresponding one of the one or more first decay time constants. The first decay time constant and the target disturbed decay time constant can be distinguished by an authentication device.

Another embodiment includes a method for producing a luminescent phosphor compound that includes the step of obtaining a baseline phosphor compound that includes a phosphor host crystal lattice material, one or more emitting ions, and a quantity of rare earth impurities, wherein the baseline phosphor compound is characterized by one or more first decay time constants. The method further includes synthesizing a disturbed phosphor compound that includes the phosphor host crystal lattice material, the one or more emitting ions, the quantity of rare earth impurities, and a quantity of one or more disturbing ions. One or more second decay time constants of the disturbed phosphor compound are measured. A determination is made whether the one or more second decay time constants are substantially equal to one or more target disturbed decay time constants that are greater than zero and less than corresponding ones of the one or more first decay time constants. When at least one of the one or more second decay time constants is not substantially equal to the one or more target disturbed decay time constants, the synthesizing, measuring, and determining steps are repeated for an additional candidate disturbed phosphor compound that has an adjusted quantity of the one or more disturbing ions that is different from the initial quantity.

An embodiment of an article includes a substrate and an authentication feature on a surface of the substrate or integrated within the substrate. The authentication feature includes a luminescent phosphor compound comprising one or more emitting ions and one or more disturbing ions and optionally one or more sensitizing ions. The one or more emitting ions have one or more first decay time constants when the one or more emitting ions are undisturbed. The one or more disturbing ions are different from the one or more emitting ions, and the one or more disturbing ions are included in the phosphor compound in a quantity that will cause at least one of the one or more emitting ions to have a pre-defined, target disturbed decay time constant that is greater than zero and less than the corresponding one of the one or more first decay time constants.

An embodiment of a method for performing authentication of an article includes the steps of exposing the article to exciting radiation, discontinuing provision of the exciting radiation, and detecting emitted radiation from the article at one or more detection intervals. The method further includes the steps of performing an analysis of information characterizing the emitted radiation, and determining, based on the analysis, whether one or more pre-defined, target disturbed decay times are within specified ranges for a phosphor composition that includes one or more emitting ions and one or more disturbing ions. When the one or more decay times are within the specified ranges, the article is identified as authentic. When the one or more decay times are not within the specified ranges, the article is identified as unauthentic.

BRIEF DESCRIPTION OF THE DRAWINGS

Embodiments of the present invention will hereinafter be described in conjunction with the following figures, wherein like numerals denote like elements, and wherein.

DETAILED DESCRIPTION

The following detailed description of various embodiments of the invention is merely exemplary in nature and is not intended to limit the inventive subject matter or the application and uses of the inventive subject matter. Furthermore, there is no intention to be bound by any theory presented in the preceding background or the following detailed description.

Luminescent phosphor compounds, articles incorporating such compounds, and methods of their manufacture and use are described herein. The below-described phosphor compounds may be used for a variety of applications including, but not limited to, incorporating such phosphor compounds into articles to enhance article authentication efforts. Embodiments of phosphor compounds, described below, each include one or more "emitting ions," one or more "disturbing ions," and optionally one or more sensitizing ions. When one of these phosphor compounds is exposed to exciting radiation, the exciting radiation may be absorbed directly by one or more of the emitting ions, and/or optionally by one or more sensitizing ions and/or by the host crystal lattice with a subsequent transfer of the energy to one or more of the emitting ions. In whichever manner the exciting radiation is absorbed, the emitting ion(s) of the phosphor compound produces emitted radiation having a unique spectral signature and a measurable decay time constant. Without the disturbing ion(s), the emitted radiation produced by the phosphor compound has a first decay time constant. With the disturbing ion(s), however, the emitted radiation produced by the phosphor compound has a second, non-zero decay time constant, which is different from the first decay time constant (e.g., shorter than the first decay time constant). The magnitude of the reduction in the value of the decay time constant is a function of the type(s) of disturbing ion(s), the nature(s) of the disturbing ion(s), and the amount(s) of the disturbing ion(s) substituted into the crystal lattice.

According to an embodiment, the quantity (or quantities) of disturbing ion(s) substituted into an acquired lot of a host crystal lattice is determined empirically based on an assessment of the raw lot stock (also referred to as the "phosphor raw materials," a "normal production phosphor," or a "baseline phosphor compound" herein), which consists of the host crystal lattice, the emitting ion(s), (optionally) the sensitizing ion(s), and a quantity of rare earth impurities. The quantity (or quantities) of disturbing ion(s) substituted into the crystal host lattice is determined based on the assessment of the phosphor raw materials in order to achieve a pre-defined, target decay time constant for a phosphor compound being synthesized (referred to below as a "target disturbed decay time constant").

As is known, the impurity levels can be very widely varying in phosphor raw materials that may be used in the making of a phosphor compound (e.g., raw materials obtained by a producer of normal production phosphors). Available phosphor raw materials are typically specified to be 99%, 99.9%, 99.95%, 99.99% or 99.999% pure. This number gives the (weight) percentage of a desired rare earth element (e.g., the desired emitting and sensitizing ions) in a total of all the rare earth elements, all expressed as oxides, which is typically abbreviated and referred to as "TREO" (Total Rare Earth Oxides) in the certificates of analysis. In the case of a 99.9% pure material, for example, the remainder is 0.1% or 1000 ppm (parts per million).

The remainder of the rare earth elements is made up of a mixture of other rare earth element impurities (i.e., rare earth elements other than the desired emitting and sensitizing ions). More particularly, the remainder includes several, typically all, of the rare earth ions. The relative concentrations of the rare earth ions depend on the desired rare earth raw material. One may expect that the closer the elements are in their properties, the more difficult they are to separate from the desired rare earth element. In general, rare earth elements that are close to each other in the periodic table are more difficult to separate, although that is not always the case. In addition, the impurity pattern may change depending on the composition of the ore used to generate the phosphor raw materials. That is, the rare earth distribution pattern of the ore may influence the impurity pattern in the rare earth raw material that goes into the synthesis of the phosphor raw materials. Accordingly, it is very unlikely, over time, to receive phosphor raw materials having the same starting pattern and impurity amounts.

Referring again to the case of a 99.9% pure material, the quantity of impurities is substantial when compared with the quantities of emitting ions (and optionally sensitizing ions) that are deliberately doped into a host lattice material. As will be indicated in more detail below, such a quantity is even more substantial when compared with quantities of one or more disturbing ions that are substituted into the host crystal lattice, according to an embodiment. However, the cost of phosphor raw materials increases significantly as the purity level increases. For example, the cost of ultra-pure material (e.g., 99.999% pure) is extremely expensive, while the cost of reasonably pure material (e.g., 99.9% pure) is substantially less expensive. Therefore, a phosphor compound manufacturer may desire to use a least pure material with which they may practically produce a phosphor compound having desired characteristics. The amount and nature (i.e., type) of the impurity rare earth ions, however, may then be different from raw material lot to raw material lot, and also in many cases not fully analyzed.

Not all impurity ions are of the same strength as disturbing ion(s) that are substituted into a host crystal lattice, according to an embodiment. In addition, not all impurity ions affect every emitting ion, and they may not have the same influence in every host crystal lattice. According to an embodiment, phosphor compound synthesis methods are employed to ensure a substantially constant quality of a synthesized phosphor compound. More particularly, embodiments include methods for producing a phosphor compound characterized by a decay time constant that is distinguishable from a decay time constant of a phosphor made of the corresponding phosphor raw materials, while being substantially equal to a pre-defined, target decay time constant.

In addition, embodiments include synthesized phosphor compounds that are characterized by a target decay time constant despite the presence of a varying amount of impurity ions in different lots of phosphor raw materials. In some cases, a phosphor material lot may be of very low purity and/or may have such a large percentage of naturally occurring rare earth ions (other than the desired emitting ions) that the decay time constant of the phosphor materials is actually below the target, disturbed decay time constant. Because the decay time constant decreases as the quantity of disturbing ions is increased (as will be discussed in conjunction with FIG. 2), such phosphor raw materials would not be convenient for use in synthesizing a disturbed phosphor compound with the target decay time constant, unless additional processing steps are performed to further purify the phosphor raw materials. Selection of phosphor raw materials with a sufficiently high purity and a reasonable cost is a cost/performance balance that can be actively adjusted to create a phosphor compound with desired properties (e.g., a desired, pre-defined, target decay time constant) in an economical manner. According to an embodiment, phosphor raw materials are selected, which have a decay time constant that is higher that the target, disturbed decay time constant, and disturbing ions are added to lower the decay time constant of the synthesized phosphor compound to the target, disturbed decay time constant.

The embodiments of phosphor compounds described below increase the diversity of available materials that may be used for authentication. The altered decay time constants that characterize the phosphor compound embodiments discussed herein may be used, in addition to spectral position, as a measurable quantity for the purpose of authentication.

Figure 1:
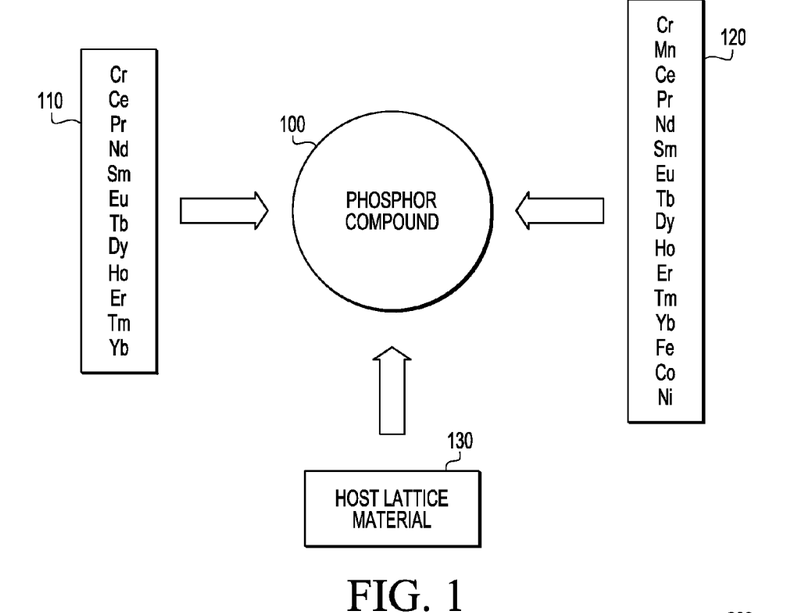
FIG. 1 depicts potential components of a phosphor compound, according to various example embodiments.

FIG. 1 depicts potential components of a phosphor compound 100, according to various example embodiments. According to various embodiments, phosphor compound 100 includes a host crystal lattice material 130, one or more emitting ions 110, and one or more disturbing ions 120. Phosphor compound 110 also may include other materials (e.g., one or more sensitizing ions), as well, although such other materials are not specifically discussed herein.

As mentioned above, there are at least three mechanisms for an emitting ion 110 to receive energy for subsequent radiation. For example, in an embodiment, the emitting ion(s) 110 may be capable of directly absorbing exciting radiation, and the emitting ion 110 may thereafter radiate at least some of the absorbed energy (typically at a different wavelength from the exciting radiation). In other embodiments, the host crystal lattice material 130 or an ion thereof (e.g., a vanadate ion) may be capable of absorbing exciting radiation directly, and transferring energy to the emitting ion(s) 110. In yet another embodiment, the host crystal lattice material 130 may contain one or more "lattice ions" that may be substituted by one or more emitting ions 110 and disturbing ions 120, and optionally one or more sensitizing ions that may absorb exciting radiation and transfer the resulting energy to the emitting ion(s) 110. Host crystal lattice absorption may be useful, in some cases, although host crystal lattice absorption is not particularly useful in a majority of cases. More typically, a transition metal ion (e.g., chromium) or a rare earth metal ion (e.g., erbium) is used as a sensitizing ion. These elements also may act as emitting ions, or they also may transfer the energy to other ions (e.g., emitting ion(s) 110), which then radiate the transferred energy. Virtually all host crystal lattice materials may act as absorbers in the ultraviolet range because the exciting photon energy is very high in this range. However, this phenomenon may not yield any emission at all from incorporated desired ions.

The lattice ions that may be replaced are ions within the host crystal lattice material 130 that may be substituted by one or more sensitizing ions, if included, one or more emitting ions 110, and one or more disturbing ions 120, up to and including 100% substitution. 100% substitution is rare since most emitting ions are concentration quenched well below a 100% substitution level. However, there are a few notable exceptions in which particular ions allow for greater substitutions since they can more easily be separated in the host crystal lattice as described below. The emitting and disturbing ions 110, 120 may be substituted at very low substitution percentages (e.g., doped at less than 1%), medium substitution percentages (e.g., from 1% to 20%), or high substitution percentages (e.g., from 20% to 100%). For example, but not by way of limitation, neodymium (Nd) may be substituted at relatively low percentages up to 1.5%, holmium (Ho) and ytterbium (Yb) may be substituted at medium percentages up to 20%, and erbium (Er) may be substituted at relatively high percentages up to 60%, although these and other ions may be substituted at different percentages, as well. As used herein, the term "substituted" means substituted at any percentage, including low, medium, and high substitution percentages. The amount of each ion substituted into a host lattice material is generally described in terms of atomic percent, where the number of ions of the host lattice material that may be replaced by sensitizing, emitting and/or disturbing ions is equal to 100%. An ion of a host material that allows for replacement with sensitizing, emitting and/or disturbing ions may typically have similar size, similar loading, and similar coordination preference as the ions it will be replaced with. As various positions within a host crystal lattice may occur, the ions on each of these positions will be accounted for 100 atomic percent.

The host crystal lattice material 130 comprises a material into which emitting ions 110 and disturbing ions 120 and optionally sensitizing agents are incorporated (e.g., substituted). More particularly, the host crystal lattice material 130 may be in the form of a crystal lattice into which different chemical constituents may substitute various positions within the lattice. In various embodiments, the host crystal lattice material 130 includes a material selected from a group consisting of an oxide, a fluoride, an oxysulfide, a halide, a borate, a silicate, a gallate, a phosphate, a vanadate, an oxyhalide, an aluminate, a molybdate, a tungstate, a garnet, and a niobate, although other host crystal lattice materials may be used, as well. For example, but not by way of limitation, the host crystal lattice 130 may include a yttrium (Y) aluminum garnet (YAG, or $Y_3Al_5O_{12}$), yttrium oxysulfide (YOS, or $Y_2O_2S$), a gadolinium (Gd) gallium garnet (GGG, $Gd_3Ga_5O_{12}$), or other materials.

In various embodiments, the total concentration of emitting ion(s) 110 substituted into the host crystal lattice material 130 is sufficient to cause the phosphor compound to produce a detectable emission after being appropriately subjected to exciting radiation. For example, the total concentration of emitting ion(s) 110 substituted in the host crystal lattice material may be in a range from about 0.095 atomic percent to about 99.995 atomic percent. However, the concentration of emitting ion(s) 110 that may be substituted while still producing the functionality of the phosphor compound (e.g., the functionality of producing an emission upon exposure to exciting radiation) depends on the type of ion that is being substituted. In other words, some ions may be substituted at relatively high percentages while still maintaining the functionality of the phosphor compound, but the functionality may be defeated if other ions are substituted at the same, relatively high percentages.

According to various embodiments, the emitting ion(s) 110 include one or more ions of elements selected from a group consisting of chromium (Cr), cerium (Ce), praseodymium (Pr), neodymium (Nd), samarium (Sm), europium (Eu), terbium (Tb), dysprosium (Dy), holmium (Ho), erbium (Er), thulium (Tm), and ytterbium (Yb). For example, one or more of the emitting ion(s) 110 may have +3 valences, in an embodiment, although one or more of the emitting ion(s) 110 may have different valences (e.g., +2 and/or +4), in other embodiments.

In a phosphor compound according to any of a number of embodiments, the disturbing ion(s) 120 within the phosphor compound 100 are different from the emitting ion(s) 110. The total concentration of disturbing ion(s) 120 substituted into the host crystal lattice material 130 may be in a range from about 0.0003 atomic percent to about 0.5 atomic percent, and is preferably between about 0.001 and 0.2 atomic percent or more, in various embodiments, although the disturbing ion(s) 120 may be included in lower or higher atomic percentages, as well. The concentration of disturbing ion(s) 120 substituted into the host crystal lattice material 130 may be greater than any background impurity level for the raw materials, while being at a sufficient concentration to achieve a desired decay time constant. As will be explained in more detail below, the concentration of disturbing ion(s) 120 is directly proportional to the reduction in the decay time constant for the phosphor compound. A benefit of adding the disturbing ion(s) 120 in lower concentrations is that the disturbing ion(s) 120 may be very difficult to detect without access to sophisticated equipment and techniques (e.g., Glow Discharge Mass Spectroscopy (GDMS)). Accordingly, the elemental composition of a phosphor compound, according to an embodiment, may be very difficult to reverse engineer. For example, typical energy dispersive X-ray microanalysis, electron backscatter diffraction, or micro X-ray fluorescence systems may not be capable of quantifying elements having low (e.g., 1% or less) concentrations in a phosphor compound.

According to various embodiments, the disturbing ion(s) 120 include one or more ions of elements selected from a group consisting of chromium (Cr), manganese (Mn), cerium (Ce), praseodymium (Pr), neodymium (Nd), samarium (Sm), europium (Eu), terbium (Tb), dysprosium (Dy), holmium (Ho), erbium (Er), thulium (Tm), ytterbium (Yb), iron (Fe), cobalt (Co), and nickel (Ni). For example, one or more of the disturbing ion(s) 120 may have +3 valences, in an embodiment, although one or more of the disturbing ion(s) 120 may have different valences (e.g., +2 and/or +4), in other embodiments.

After exposure to exciting radiation, the emitting ion(s) 110 within the phosphor compound emit photons, and the intensity of the emission over time may be observed. Upon removal of the exciting radiation, the intensity of the emission decays over time, and the rate of decay for each emitting ion 110 can be characterized by a decay time constant. For example, for a simple exponential decay in emission intensity, the decay time constant can be represented by the constant τ in the equation:

$$I(t) = I_0 e^{-t/\tau},\quad\text{(Equation 1)}$$

where t denotes time, I denotes the emission intensity at time t, and $I_0$ denotes the emission intensity at t=0 (e.g., t=0 may correspond to the instant when the provision of exciting radiation is discontinued). Although the emission intensity for some phosphor compounds may decay according to the above, simple exponential formula, the emission intensity for other phosphor compounds may be affected by multiple exponential decays (e.g., when multiple mechanisms affecting the decay are present). According to an embodiment, each emitting ion 110 would be characterized by a first decay time constant if the emitting ion were "undisturbed" within the phosphor compound (e.g., as in a normal production phosphor). The term "undisturbed," when applied to an emitting ion, refers to the emitting ion being included in a phosphor compound that lacks a corresponding disturbing ion that otherwise may have a significant effect on the emissions of the emitting ion, where a "significant effect" means an effect that is measurably greater than effects that may otherwise be produced due to rare earth impurities (e.g., impurities present in small amounts, such as a few ppm) present in the normal production phosphor. This decay time constant associated with an undisturbed emitting ion is referred to herein as an "undisturbed decay time constant," which characterizes a phosphor compound (e.g., a normal production phosphor) that does not include any disturbing ion(s) 120 beyond the level of rare earth impurities that may be associated with the raw materials. As discussed previously, the level of rare earth impurities in an "undisturbed" phosphor compound depends on the purity level of the phosphor raw materials. Although a relatively low level of impurities may produce only minor changes to emitted radiation temporal properties of the phosphor compound, higher levels of impurities may produce more pronounced changes in the temporal properties of the phosphor compound.

Embodiments include methods for producing disturbed phosphor compounds characterized by emitted radiation temporal properties (e.g., a target disturbed decay time constant) that are significantly different from the emitted radiation temporal properties of the corresponding normal production phosphor. In an embodiment, addition of one or more disturbing ion(s) produces a significant change in the emitted radiation temporal properties of the corresponding normal production phosphor. As used herein, and according to an embodiment, a "significant change" in an emitted radiation temporal property may be defined as a reduction in a decay time constant of a phosphor compound of 20% or more. According to another embodiment, a "significant change" in an emitted radiation temporal property may be defined as a reduction in a decay time constant of a phosphor compound of only 10% or more. As used herein, the term "undisturbed decay time constant" means a decay time constant associated with an emission produced by an emitting ion (e.g., one of emitting ions 110) that is present in a phosphor compound that does not include a disturbing ion (e.g., one of disturbing ions 120) beyond the level of rare earth impurities that may be associated with the phosphor raw materials (or a normal production phosphor).

According to various embodiments, a phosphor compound (e.g., phosphor compound 100) does, however, include one or more disturbing ions 120, and each disturbing ion 120 causes a "significant change" to the undisturbed decay time constant for at least one of the emitting ion(s) 110. According to an embodiment, for a particular host crystal lattice and emitting ion 110, a disturbing ion 120 is chosen that will produce a desired significant change in the decay time constant for the phosphor compound. Some disturbing ion(s) 120 may cause a significant change to the decay time constant when included in a particular host crystal lattice with a particular emitting ion 110, and other disturbing ion(s) 120 may not cause a significant change to the decay time constant (although those other disturbing ion(s) 120 may cause significant changes when included in a different host crystal lattice or with a different emitting ion 110). A decay time constant that is altered by a disturbing ion 120 is referred to herein as a "disturbed decay time constant." A "target disturbed decay time constant" is a disturbed decay time constant that has a pre-defined value. According to a particular embodiment, a quantity of a disturbing ion 120 (or multiple disturbing ions) is substituted into the host crystal lattice material 130 to cause an emitting ion 110 (or multiple emitting ions) to have a disturbed decay time constant (or more specifically, a target disturbed decay time constant) that is greater than zero and less than the undisturbed decay time constant for the emitting ion 110. In other words, the disturbing ion(s) 120 have the effect of lowering the decay time constant(s) of the emitting ion(s) 110, without completely quenching the emissions. The quantity of disturbing ion(s) 120 substituted into the host crystal lattice 130 in order to achieve a target disturbed decay time constant for the phosphor compound 100 depends on the level of impurities in the corresponding phosphor raw materials, and this quantity is determined empirically, as will be discussed in more detail below. In various embodiments, the decrease in the decay time constant may occur in nearly a linear fashion after a certain amount of disturbing ion(s) 120 are added. The correlation also may follow a non-linear equation, such as, but not limited to, a quadratic function. A relationship may be predicted between the quantity of a disturbing ion and the decay time constant. Accordingly, a phosphor compound developer may pre-select a desired value for the target disturbed decay time constant, and may produce a synthesized phosphor compound that achieves that value by selecting from a number of possible disturbing ions and predicting the quantities at which they are included in the compound.

As will also be discussed in more detail below, an authentication system (e.g., system 400, FIG. 4) is capable of measuring decay time constants for phosphor compounds (e.g., phosphor compound 100). When a measured decay time constant for a particular emitting ion 110 corresponds to a disturbed decay time constant, the phosphor compound may be differentiated from a normal production phosphor (i.e., the same compound that lacks the disturbing ion(s) 120, which would have an undisturbed decay time constant). More specifically, when the measured decay time constant is substantially equal to a target disturbed decay time constant, the phosphor compound may be considered to be an authenticating phosphor compound. According to an embodiment, "substantially equal" in this context means that the measured decay time constant is within a relatively narrow range of decay time constants corresponding to the target disturbed decay time constant. In order to achieve a high level of security, it may be desirable for the range of target disturbed decay time constants to be relatively narrow (e.g., an upper limit of the range is within 5%, 10%, or some other percentage of the lower limit of the range). In at least some embodiments, the spectral signature of the phosphor compound with disturbing ion(s) 120 may be substantially the same (in wavelength) as the spectral signature of a corresponding normal production phosphor, despite the differing decay time constants, although this may not always be the case. Regardless, the quantity of disturbing ion(s) 120 included in the phosphor compound 100 desirably is sufficient to enable a disturbed decay time constant to be differentiated from a corresponding undisturbed decay time constant. In addition, the difference between the disturbed and undisturbed decay time constants should be sufficient to account for production purity variations and potential measurement errors. Accordingly, the various embodiments include phosphor compounds 100 with disturbed decay time constants (and more specifically target disturbed decay time constants) that are detectably different from the undisturbed decay time constants of corresponding normal production phosphors, thus providing additional phosphor compounds that may be used for authentication and other purposes.

The term "disturbed phosphor compound" means a phosphor compound that includes one or more disturbing ions that have been intentionally added to the phosphor compound, according to an embodiment, whereas an "undisturbed phosphor compound" refers to the same phosphor compound without the disturbing ions (beyond the level of impurities that may be associated with the raw materials). In some cases, an emitting ion (e.g., one of emitting ions 110, FIG. 1) is excited via a direct absorption process, which includes providing exciting radiation within the absorption band for the emitting ion. Alternatively, the host crystal lattice or a sensitizing ion may function as a path to excite the emitting ion, as described previously. In the former case, the emission from the emitting ion decays rapidly from the absorption resonance level to a storage level. Generally, the absorption band is above the storage level, although this is not always the case, and the decay time from the absorption resonance level is very rapid compared to the decay time from the storage level. From the storage level and in the absence of an appropriate disturbing ion, spontaneous photon emission may occur at a wavelength band determined by the storage level and a lower energy level.

An appropriate disturbing ion for a particular emitting ion may have a resonance with the storage level in transitioning from the storage level to the lower energy level, which may allow preferential energy transfer to the disturbing ion rather than via the normal emission path (e.g., photon emission). For the disturbing ion, the energy transferred from the emitting ion to the disturbing ion (e.g., the energy "absorbed" by the disturbing ion) may be discharged during a very rapid non-radiative decay to a ground state. This leaves the disturbing ion back in the unexcited state to repeat the process. In various embodiments, disturbing ions may be selected, which tend to have very large numbers of energy levels (e.g., Dy), although that is not a requirement. This allows the disturbing ion to be at or near resonance for a relatively large number of emitting ions (e.g., "good" radiative ions), thus allowing the excited state energy for the emitting ions to be rapidly siphoned off by the disturbing ion without as much of a radiative output as would have occurred if the disturbing ion were not present in the host crystal lattice material. As will be explained in more detail below, the decay time constant(s) of the emitted electromagnetic radiation from one or more of the emitting ions 110 may be used to determine whether or not the phosphor compound 100 corresponds to an authenticating phosphor compound.

Figure 2:
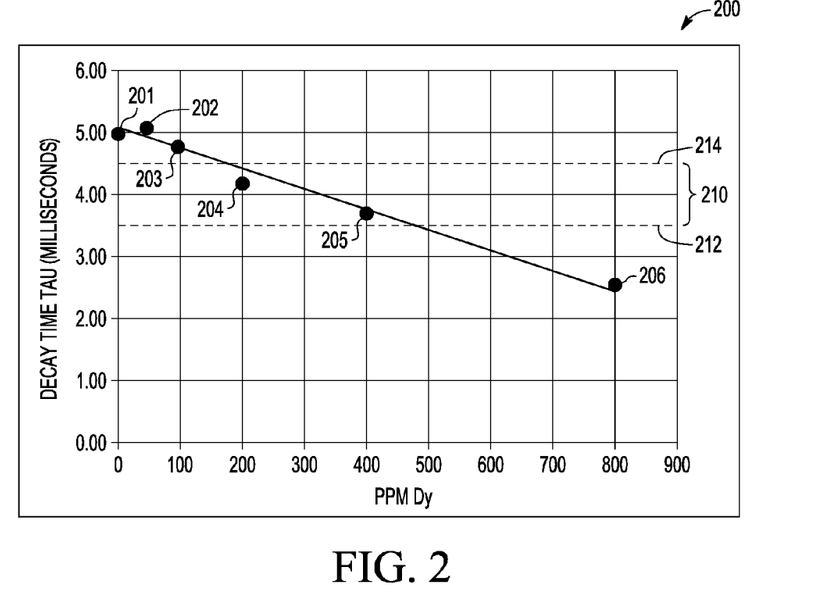
FIG. 2 is a graph illustrating decay time constant as a function of disturbing ion concentration for an example phosphor composition, in accordance with an example embodiment.

FIG. 2 is a graph 200 illustrating decay time constant (Tau) as a function of disturbing ion concentration for an example phosphor composition, in accordance with an example embodiment. More particularly, graph 200 illustrates the effect on the decay time constant, in milliseconds (ms), of 99.99% pure yttrium aluminum garnet (YAG) with about 4% erbium (Er) substituted as the emitting ion, and various quantities of dysprosium (Dy) substituted as the disturbing ion.

Point 201 corresponds to a YAG:Er phosphor compound that does not include any intentionally substituted dysprosium, although the rare earth impurities in the YAG:Er raw materials almost certainly contain some quantity of dysprosium, along with other rare earth (and non-rare earth) impurities. As will be described in more detail below, point 201 may quantify an experimental result obtained (e.g., in block 304, FIG. 3) by measuring an undisturbed decay time constant for a baseline phosphor compound. In contrast, points 202-206 correspond to YAG:Er phosphor compounds that include quantities of dysprosium (as the disturbing ion) at about 50 ppm, 100 ppm, 200 ppm, 400 ppm, and 800 ppm, respectively. As will also be described in more detail below, the various quantities of dysprosium may be considered to be "experimental quantities" of a disturbing ion (e.g., as defined in block 306, FIG. 3), and points 202-206 may quantify experimental results obtained (e.g., in block 310, FIG. 3) by measuring the disturbed decay time constants for the corresponding disturbed phosphor compounds.

Referring again to FIG. 2, between zero and 800 ppm intentionally substituted dysprosium, the decay time constant falls from about 5.00 ms to about 2.50 ms, which represents a reduction of 50% in the decay time constant. As indicated, the decay time constant reduction with increasing disturbing ion concentration is nearly linear over the substitution range. A linear reduction may not be observed, however, for many host crystal lattice, emitting ion, and disturbing ion combinations. In addition to the reductions in decay time constant, a significant signal reduction also may be observed with increasing disturbing ion concentration. The signal reduction also may be (or may not be) nearly linear over a restricted substitution range.

As mentioned previously, embodiments include synthesizing a disturbed phosphor compound with a pre-defined, target disturbed decay time constant, where the decay time constant may be within a relatively narrow range of decay time constants. For example, for the YAG:Er phosphor compound of FIG. 2, it may be desired to produce a disturbed YAG:Er phosphor compound by substituting a quantity of dysprosium that results in a target disturbed decay time constant of about 4.00 ms. More particularly, it may be desired to produce a disturbed YAG:Er phosphor compound with a disturbed decay time constant in a range 210 that encompasses the target disturbed decay time constant of 4.00 ms. For example, the target disturbed decay time constant may be any decay time constant within a range of about 3.50 ms to about 4.50 ms, as indicated by lower and upper range limits 212, 214. This range 210 corresponds to the target disturbed decay time constant of 4.00 ms+/−12.5% (e.g., a range of accuracy of +/−12.5%). As indicated in FIG. 2, points 204 and 205 fall within range 210, and these points 204, 205 correspond to the addition of dysprosium at 200 ppm and 400 ppm, respectively. Accordingly, for the given YAG:Er raw materials, in order to produce a disturbed phosphor compound characterized by a disturbed decay time constant within range 210, dysprosium could be added in quantities of about 200 ppm, 400 ppm, or some quantity in between.

Because the YAG:Er constituting the phosphor raw materials already contained a certain quantity of rare earth impurities prior to the intentional substitution of dysprosium as a disturbing ion, the decay time constant corresponding to point 201 likely is significantly lower than the decay time constant would be for an ultra-pure (e.g., 99.999% pure) YAG:Er phosphor compound. However, as discussed previously, the cost of ultra-pure material is substantially higher than the cost of reasonably pure material, and embodiments discussed below facilitate the production of disturbed phosphor compounds having desired, pre-defined, disturbed decay time constants using economically-priced phosphor raw materials. In some cases, it may be desirable to use phosphor raw materials having higher purity, however, because the phosphor yield using higher purity materials may be higher than yields that may be obtainable using lower purity materials. Accordingly, in selecting the phosphor raw materials for use with the various embodiments, cost/yield considerations may be taken into account.

Figure 3:
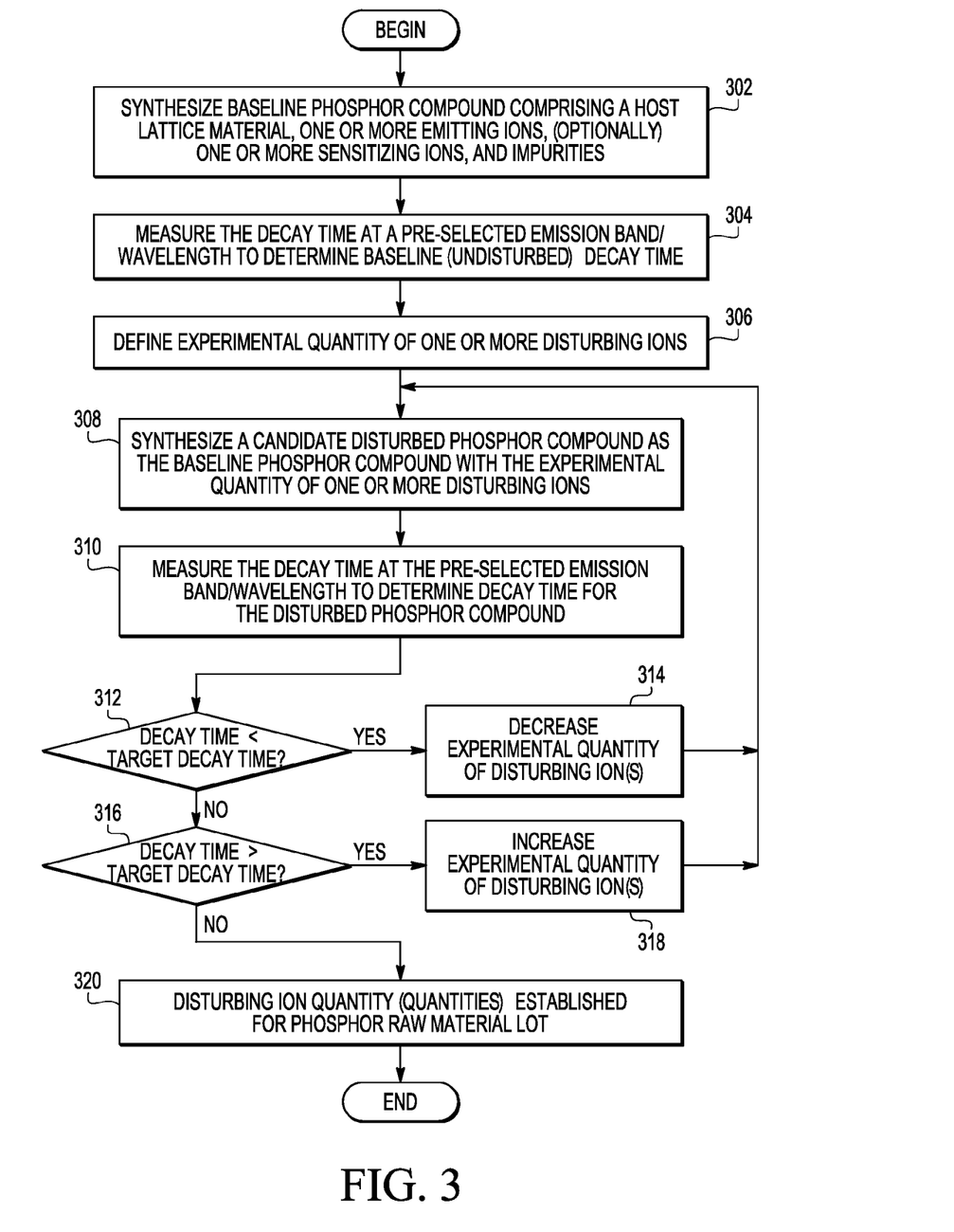
FIG. 3 is a flowchart of a method for producing a phosphor compound, in accordance with an example embodiment.

FIG. 3 is a flowchart of a method for producing a phosphor compound (e.g., phosphor compound 100, FIG. 1), in accordance with an example embodiment. Generally, a phosphor compound in accordance with an embodiment may be created using any of a number of conventional processes that are known to those of skill in the art, except that, according to an embodiment, a relatively small proportion of one or more disturbing ions (e.g., disturbing ions 120, FIG. 1) are added to the compound using compatible source molecule(s) that contain the disturbing ion(s), during creation of the compound. The quantity (or quantities) of the disturbing ion(s) may be determined based on an analysis of the phosphor raw materials (i.e., the host crystal lattice, emitting ion(s), (optional) sensitizing ion(s), and the included rare earth impurities), and subsequent analysis of one or more candidate phosphor compounds that include various quantities and/or types of disturbing ion(s). Essentially, empirical techniques are employed to produce a phosphor compound that is characterized by a target disturbed decay time constant, where the target disturbed decay time constant is achieved by substituting a quantity of disturbing ion(s) into the host crystal lattice, and the quantity depends on the purity of the raw lot stock, among other things. Although the below description of the method describes analyzing only one disturbed decay time constant (including comparisons with only one target disturbed decay time constant), it is to be understood that the method may be used to analyze multiple disturbed decay time constants associated with multiple emitting ions, as well (including comparisons with multiple target disturbed decay time constants).

Prior to empirically determining a quantity (or quantities) of disturbing ion(s) to include in the disturbed phosphor compound, a chemical analysis may be performed on a baseline phosphor compound (e.g., a phosphor compound generated using a particular lot of phosphor raw materials) and/or its constituting raw materials. As discussed above, the phosphor raw materials include some quantity of impurities, which may consist of various concentrations of different rare earth impurities. The chemical analysis may include, for example, determining which of the impurities affect the temporal behavior of the baseline phosphor compound, and which do not. Rare element impurities that are very close on the periodic table to the emitting ion(s) may have the greatest effect. In addition, although some impurities may be included at very low concentrations (e.g., trace amounts), they still may have a pronounced effect on the temporal behavior of the baseline phosphor compound. According to an embodiment, the temporal behavior of the baseline phosphor compound and knowledge acquired in the context of the chemical analysis may be used to determine a suitable disturbing ion (or disturbing ion combination) that produces the desired temporal behavior (e.g., a target disturbed decay time constant).

The method may begin, in block 302, by obtaining (e.g., as phosphor raw materials) or synthesizing a baseline phosphor compound comprising a host lattice material, one or more emitting ions, (optionally) one or more sensitizing ions, and some quantity of rare earth impurities. As previously discussed, the quantity of rare earth impurities defines the purity of the baseline phosphor compound. Embodiments may be used with baseline phosphor compounds having various quantities of rare earth impurities, including significant quantities of rare earth impurities. For example, embodiments may be used with baseline phosphor compounds having any level of purity including baseline phosphor compounds characterized as being 99%, 99.9%, 99.95%, 99.99% or 99.999% pure.

Synthesis of the baseline phosphor compound includes preparing a combination of a phosphor host crystal lattice material (e.g., host crystal lattice material 130, FIG. 1), one or more emitting ions (e.g., one or more of emitting ions 110, FIG. 1), and (optionally) one or more sensitizing ions to form a preliminary phosphor compound. In some cases, this may be achieved using solid state chemistry. For example, but not by way of limitation, when the phosphor compound is an oxide phosphor, this may include combining correct proportions of various oxides with oxides of the emitting ion and the sensitizing ion. These oxides are mixed and fired for a prescribed time. In other cases, solution chemistry techniques may be used, in which the various materials are dissolved, subsequently precipitated, and subsequently fired. As discussed previously, when incorporated into the host lattice material, each emitting ion selected for the compound has a first decay time constant, which may be affected by the presence of the impurities in the baseline phosphor compound.

Depending on the particular process used to create the compound, other materials may be included in the combination of the host crystal lattice material, emitting ion(s), and sensitizing ion(s) in forming the baseline phosphor compound. For example, but not by way of limitation, various fluxing agents and other pre-cursors may be included within the baseline phosphor compound. After combining the phosphor raw materials, the baseline phosphor compound is post-processed. For example, but not by way of limitation, post-processing may include performing any one or more of the following processes to the baseline phosphor compound: firing; annealing; suspension; precursor removal (e.g., to remove fluxing agents); milling; sedimentation; and sonication.

In block 304, the decay time of the baseline phosphor compound is measured at a pre-selected emission band/wavelength to determine a baseline decay time constant (or an undisturbed decay time constant). The baseline decay time constant may be used, for example, to ensure that the disturbed decay time constant of a disturbed phosphor compound is sufficiently different from the decay time constant that characterizes the undisturbed phosphor compound. Methods and apparatus for measuring decay times are discussed in more detail in conjunction with FIGS. 4 and 5, later, and such methods and apparatus are not discussed here for purposes of brevity.

Once the baseline decay time constant is determined, an iterative process of synthesizing and analyzing candidate phosphor compounds is then performed, in order to determine a quantity (or quantities) of disturbing ion(s) that should be substituted into the host crystal lattice to achieve a target disturbed decay time constant. In block 306, an initial experimental quantity for each of one or more disturbing ions is defined. For example, the initial experimental quantity for each disturbing ion initially may be a relatively low quantity, and the iterative process may gradually increase the quantity (e.g., in block 318) until the target disturbed decay time constant is achieved. Conversely, the initial experimental quantity for each disturbing ion initially may be a relatively high quantity, and the iterative process may gradually decrease the quantity (e.g., in block 314) until the target disturbed decay time constant is achieved. The process flow described below contemplates either method.

In block 308, a candidate disturbed phosphor compound is synthesized comprising the phosphor raw materials in the baseline phosphor compound (i.e., the host lattice material, the one or more emitting ions, (optionally) one or more sensitizing ions, and the rare earth impurities) and the initial experimental quantity of each of the one or more disturbing ions. Synthesis of the disturbed phosphor compound desirably is performed using substantially the same processes as were used to synthesize the baseline phosphor compound (e.g., step 302), although different processes also may be used.

In block 310, the decay time of the candidate disturbed phosphor compound is measured at the pre-selected emission band/wavelength to determine a disturbed decay time constant for the candidate disturbed phosphor compound. A determination is then made whether the disturbed decay time constant is equal to the target decay time constant, within an acceptable degree of accuracy (e.g., within from 1% to 5% or some other degree of accuracy). For example, a determination initially may be made, in block 312, whether the disturbed decay time constant measured in block 310 is less than the target decay time constant.

When the disturbed decay time constant is less than the target decay time constant, an assumption may be made that the experimental quantity of one or more of the disturbing ions in the candidate disturbed phosphor compound is too high (e.g., the disturbing ions are quenching too much of the emissions from the emitting ion(s)). In such a case, the experimental quantity of at least one of the one or more disturbing ions is decreased, in block 314. The method then iterates as shown, where a new candidate disturbed phosphor compound is synthesized (in block 308) and analyzed (in blocks 310, 312).

Referring again to block 312, when the disturbed decay time constant is not less than the target decay time constant, a further determination may be made, in block 316, whether the disturbed decay time constant is greater than the target decay time. When the disturbed decay time constant is greater than the target decay time constant, an assumption may be made that the experimental quantity of one or more of the disturbing ions in the candidate disturbed phosphor compound is too low (e.g., the disturbing ions are not quenching enough of the emissions from the emitting ion(s)). In such a case, the experimental quantity of at least one of the one or more disturbing ions is increased, in block 318. The method then iterates as shown, where a new candidate disturbed phosphor compound is synthesized (in block 308) and analyzed (in blocks 310, 312, and 316). It is to be understood that blocks 312 and 314 may be performed in reverse order, in an alternate embodiment.

During the process of determining the quantity of disturbing ion(s) to include in the disturbed phosphor compound, and once a sufficient quantity of data has been collected, a relationship (e.g., a correlation curve) may be established between the decay time difference (i.e., the difference between a disturbed decay time constant for a particular candidate disturbed phosphor compound and the target decay time constant) and the amount of a disturbing ion (or combination of disturbing ions) that should be included in the phosphor compound to achieve the target, disturbed decay time constant.

When a determination is made that the disturbed decay time constant is equal to the target decay time constant within an acceptable level of accuracy (i.e., both steps 312 and 316 yield a negative result), an assumption may be made that a quantity of each disturbing ion has been discovered, which yields a disturbed phosphor compound that is characterized by the target disturbed decay time constant. Accordingly, in block 320, the quantity of each disturbing ion is considered to be established for the particular lot of phosphor raw materials used in the process.

Once the quantity of each disturbing ion is determined (e.g., using the method of FIG. 3), Bulk quantities of the disturbed phosphor compound may then be synthesized using the quantity of each disturbing ion determined using the method. The resulting disturbed phosphor compound may then be incorporated into any of a variety of articles so that the benefits of its various characteristics may be realized. For example, but not by way of limitation, the disturbed phosphor compound may be incorporated into an article to provide a way of authenticating the article.

Figure 4:
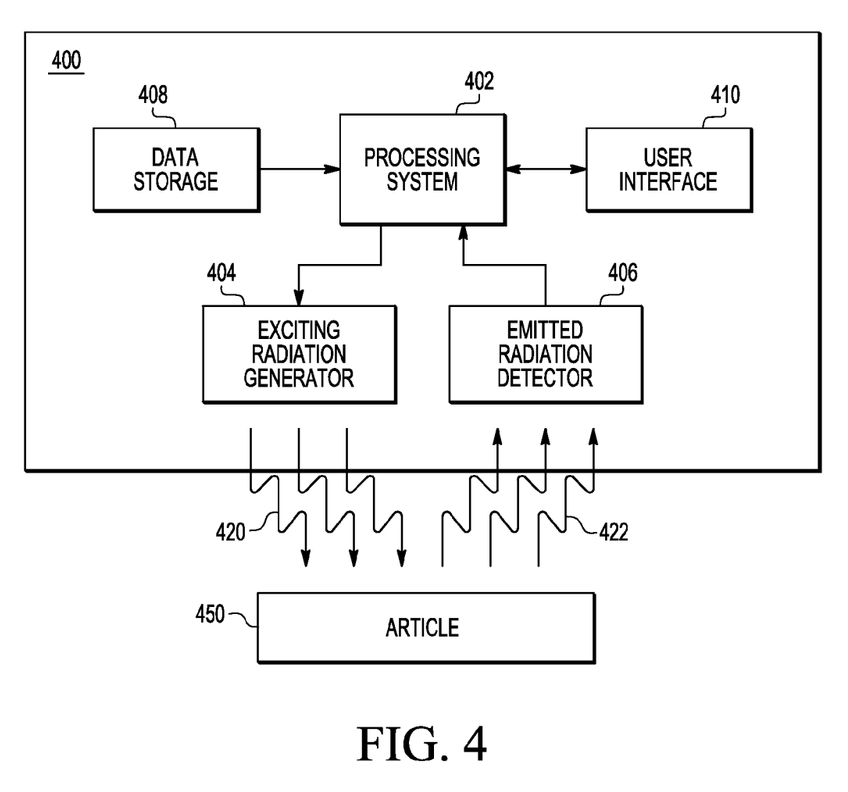
FIG. 4 is a system for authenticating an article, in accordance with an example embodiment.

FIG. 4 is a system 400 for authenticating an article 450, in accordance with an example embodiment. System 400 includes a processing system 402, an exciting radiation generator 404, an emitted radiation detector 406, data storage 408, and a user interface 410, according to an embodiment. Processing system 402 may include one or more processors and associated circuitry, which is configured to implement control and analysis processes (e.g., in the form of executable software algorithms) associated with authenticating an article (e.g., article 450). According to an embodiment, processing system 402 is configured to provide control signals to exciting radiation generator 404, which cause exciting radiation generator 404 to direct exciting radiation 420 toward article 450. In the control signals, processing system 402 may specify the timing (e.g., start time, stop time, and/or duration) of the provision of exciting radiation, and/or other parameters associated with the particular exciting radiation to be generated (e.g., intensities and/or other parameters). Typically, the bandwidth of the exciting radiation is pre-determined based on the excitation source that is included as part of the exciting radiation generator 404 (e.g., the bandwidth of excitation produced by a selected light emitting diode or laser diode). The various timing and/or radiation generation parameters may be retrieved from data storage 408, for example. Exciting radiation generator 404 may include, for example but not by way of limitation, one or more lasers, laser diodes, light-emitting diodes (LEDs), incandescent filaments, lamps, or other excitation sources.

In addition to controlling exciting radiation generator 404, processing system 402 is configured to provide control inputs to emitted radiation detector 406, which cause emitted radiation detector 406 to attempt to detect emitted radiation 422 produced by article 450 in response to having absorbed (either directly or indirectly) at least some of the exciting radiation 420. Emitted radiation detector 406 may include, for example but not by way of limitation, a spectral filter, one or more electro-optical sensors, photomultiplier tubes, avalanche photodiodes, photodiodes, charge-coupled devices, charge-injection devices, photographic films, or other detection devices. In a particular embodiment, the emitted radiation detector 406 includes a spectral filter positioned between the article 450 and a photodetector. The spectral filter passes light only within a spectral band of interest, and rejects all other light. The photodetector has sensitivity within the spectral band of interest, and accordingly may detect light passing through the spectral filter that is within that spectral band. The emitted radiation detector 406 may digitize intensity values at one or more pre-selected intervals (e.g., starting at t=0, and then every 0.1 milliseconds thereafter, for several intervals). Emitted radiation detector 406 provides information to processing system 402 (e.g., the digitized intensity values), which enables the temporal properties of any detected radiation 422 to be characterized.

Processing system 402 is configured to analyze such information, upon its receipt, in order to determine whether or not the temporal properties of any detected radiation (e.g., the decay time constant) correspond to the temporal properties of an authenticating phosphor compound. In addition, in an embodiment, processing system 402 may determine whether the magnitude of the detected radiation is within a pre-determined range. For example, information characterizing the temporal properties and the range of emission magnitudes of one or more authenticating phosphor compounds may be retrieved from data storage 408. According to various embodiments, the system 400 may be used to detect the temporal properties of emissions within a single, relatively narrow frequency band (e.g., to detect emissions from a single emitting ion), or the system 400 may be used to detect the temporal properties of emissions within multiple frequency bands (e.g., to detect emissions from multiple emitting ions). More specifically, the system 400 may detect the decay time constants of emissions within one or more frequency bands.

The system 400 may then determine whether the temporal properties (and/or the emission magnitude) of detected radiation do correspond to the temporal properties (and/or the emission magnitude range) of an authenticating phosphor compound. For example, the system 400 may determine whether the measured decay time constant(s) equal target disturbed decay time constant(s) associated with an authenticating phosphor compound. When the temporal properties of the detected radiation do correspond to the temporal properties of an authenticating phosphor compound, processing system 402 may take some action associated with identifying article 450 as an authentic article. For example, processing system 402 may send a signal to user interface 410, which causes user interface 410 to produce a user-perceptible indication of authenticity (e.g., a displayed indicia, a light, a sound, and so on), and/or processing system 402 may cause a routing component of system 400 (not illustrated) to route article 450 toward a route or bin assigned for authentic articles. Alternatively, when insufficient radiation is detected or the temporal properties of detected radiation do not correspond to the expected pre-determined authentication parameters of an authenticating phosphor compound (e.g., the decay time constant does not equal the target disturbed decay time constant), processing system 402 may take some action associated with identifying article 450 as an unauthentic article. For example, processing system 402 may send a signal to user interface 410, which causes user interface 410 to produce a user-perceptible indication of non-authenticity (e.g., a displayed indicia, a light, a sound, and so on), and/or processing system 402 may cause a routing component of system 400 (not illustrated) to route article 450 toward a route or bin assigned for non-authentic articles.

User interface 410 may include any of a number of components that may be manipulated by a user to provide inputs to system 400 (e.g., keyboards, buttons, touchscreens, and so on), or which may be controlled by processing system 402 to produce user-perceptible indicia (e.g., display screens, lights, speakers, and so on). The above-described process may be initiated in response to user inputs provided through the user's interaction with user interface 410, for example. Alternatively, the above-described process may be initiated automatically by the system 400, such as when the article 450 has been positioned in a location at which the excitation and detection processes may be performed.

Figure 5:
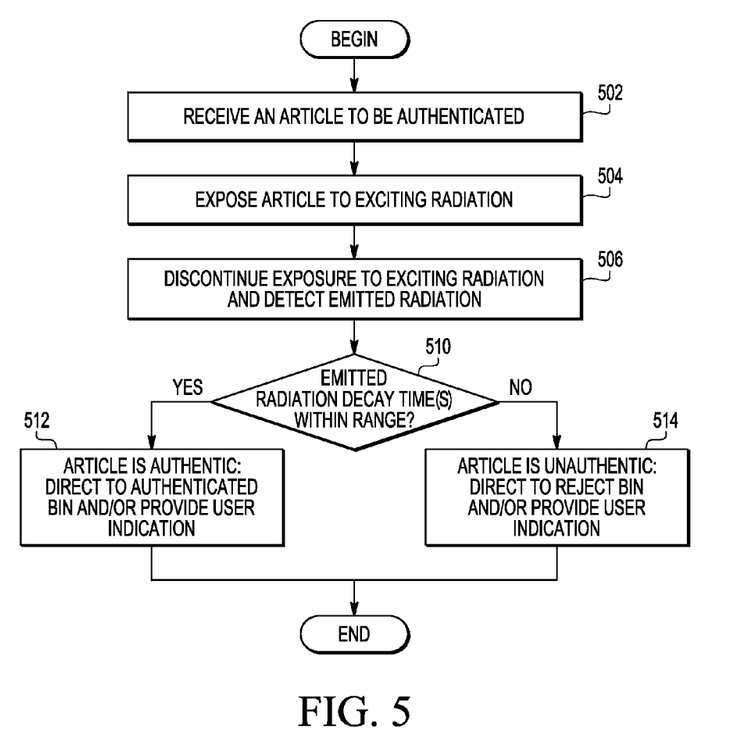
FIG. 5 is a flowchart of a method for performing authentication of an article that may include a phosphor compound, in accordance with an example embodiment.

FIG. 5 is a flowchart of a method for performing authentication of an article that may include a phosphor compound, in accordance with an example embodiment. For example, embodiments of the method depicted in FIG. 5 may be performed by an authentication system (e.g., authentication system 400, FIG. 4). The method may begin, in block 502, when an article to be authenticated (e.g., article 450, FIG. 4) is received by the authentication system. For example, the article may be manually placed within an appropriate receptacle of the authentication system, or the article may automatically be routed into the receptacle (e.g., by a sorting or conveyor system).

In block 504, the article is exposed to exciting radiation. For example, the article may be moved to an excitation position (e.g., under an excitation window), and the processing system (e.g., processing system 402, FIG. 4) may send a control signal to an exciting radiation generator (e.g., exciting radiation generator 404, FIG. 4) that causes the exciting radiation generator to direct exciting radiation toward the article. Alternatively, the exciting radiation generator may continuously provide the exciting radiation or the exciting radiation may be modulated.

In block 506, provision of the exciting radiation to the article is discontinued. This may be accomplished either by turning the exciting radiation off (e.g., in a system in which the article may remain stationary and the exciting radiation is pulsed), or by moving the article away from the area where the exciting radiation is being directed and to a detection position (e.g., under a detection window). The authentication system may then detect emitted radiation (e.g., within one or more bands) from the article (e.g., by emitted radiation detector 406, FIG. 4) at one or more detection intervals, which are measured from the time that direction of the exciting radiation toward the article was discontinued. According to an embodiment, the system is configured to detect emitted radiation in a range between about 700 nanometers and about 2200 nanometers, although the system may be configured to detect emitted radiation having lower or higher wavelengths, as well.

Information characterizing the temporal behavior and, in some cases, the intensity of detected, emitted radiation is then analyzed. According to an embodiment, the decay time of emitted radiation within one or more bands is determined, and a determination is made, in block 510, whether the decay time(s) are within specified ranges for the particular phosphor compound that indicate that the decay time(s) are equal to target disturbed decay time constant(s). For example, the specified ranges may indicate levels of accuracy to which the measured decay time should correlate with the corresponding target disturbed decay time constants. In an embodiment, the decay time(s) may be determined based on the detected intensities of the emitted radiation at multiple times (e.g., t=0, t=0.1 millisecond, and so on). Although the determinations of decay time within a single band may used as a basis for authenticating an article, in an embodiment, the determinations alternatively may be made by analyzing relative intensities of emitted radiation in multiple bands (e.g., analysis of the ratios of the intensities of emitted radiation in multiple bands), in other embodiments. Analysis using the relative intensities may be more desirable than an absolute intensity evaluation, because various factors, which may not be readily accountable for, may affect the accuracy of an absolute intensity reading. For example, the intensity of emitted radiation may be affected by soil and/or wear on the article or authentication feature, variations in the printing of authentication features, optical geometry, reflectivity of the substrate, light scattering within the substrate, size and shape of the article, substrate thickness versus penetration depth of the exciting radiation, and the power level of the laser, to name a few factors.

When the temporal characteristics (e.g., the decay time constant) of the emitted radiation are within the specified ranges for the specific detection time (as determined in block 510), the system may identify the article as being "authentic," and may take a corresponding action, in block 512. For example, the system may produce a user-perceptible indication of authenticity, and/or may cause a routing component of the system to route the article toward a route or bin assigned for authentic articles. Alternatively, when the temporal characteristics of the emitted radiation are not within specified ranges (as determined in block 510), the system may identify the article as being "unauthentic," and may take a corresponding action, in block 514. For example, the system may produce a user-perceptible indication of non-authenticity, and/or may cause a routing component of the system to route the article toward a route or bin assigned for unauthentic articles.

Figure 6:
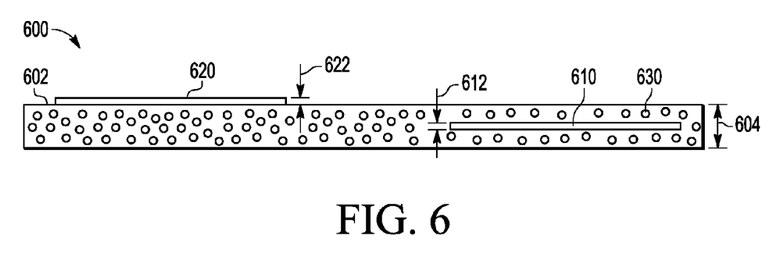
FIG. 6 depicts a cross-sectional view of an article with phosphor-containing, embedded and printed authentication features, according to an example embodiment.

FIG. 6 depicts a cross-sectional view of an article 600 that includes a disturbed phosphor-containing material, according to an example embodiment. For example, an embodiment of an article 600 may include embedded and/or surface-applied authentication features 610, 620, and/or the article 600 may include phosphor particles 630 that are evenly or unevenly dispersed within one or more components of the article 600 (e.g., within substrate 602 and/or one or more layers or other components of the article). The various relative dimensions of the authentication features 610, 620 and particles 630 may not be to scale in FIG. 6. Although article 600 is illustrated to include both embedded and surface-applied authentication features 610, 620 and particles 630, another article may include one or a combination of embedded authentication features, surface-applied authentication features, and dispersed phosphor particles. Finally, although only one each of embedded authentication feature 610, 620 are shown in FIG. 6, an article may include more than one of either type of authentication feature 610, 620.

Article 600 includes a substrate 602, which may be rigid or flexible, and which may be formed from one or more layers or components, in various embodiments. The variety of configurations of substrate 602 are too numerous to mention, as the phosphor compounds of the various embodiments may be used in conjunction with a vast array of different types of articles. Therefore, although a simple, unitary substrate 602 is illustrated in FIG. 6, it is to be understood that substrate 602 may have any of a variety of different configurations. In addition, although inanimate, solid articles are discussed herein, it is to be understood that an "article" also may include a human, an animal, a biological specimen, a liquid sample, and virtually any other object or material into or onto which a phosphor compound of an embodiment may be included.

Embedded authentication feature 610 comprises one or more rigid or flexible materials in which or onto which a disturbed phosphor compound of an embodiment is included. For example, but not by way of limitation, embedded authentication feature 610 may be configured in the form of a discrete, rigid or flexible substrate, a security thread, or another type of structure. According to various embodiments, embedded authentication feature 610 may have a thickness 612 in a range of about one micron up to the thickness 604 of the substrate 602, and embedded authentication feature 610 may have a width and length that is less than or equal to the width and length of the substrate 602.

Surface-applied authentication feature 620 may be, for example but not by way of limitation, a printed authentication feature or an authentication feature that includes one or more rigid or flexible materials into which or onto which a phosphor compound of an embodiment is included. For example, but not by way of limitation, the surface-applied authentication feature 620 may comprise an ink, pigment, coating, or paint that includes a phosphor compound of an embodiment. Alternatively, the surface-applied authentication feature 620 may comprise one or more rigid or flexible materials into which or onto which a phosphor compound of an embodiment is included, where the substrate is then adhered or otherwise attached to a surface of the article substrate 602. According to various embodiments, surface-applied authentication feature 620 may have a thickness 622 of about one micron or more, and surface-applied authentication feature 620 may have a width and length that is less than or equal to the width and length of the substrate 602.

Phosphor particles 630 may be evenly or unevenly dispersed within substrate 602, as shown in FIG. 6, or within one or more other components of the article 600 (e.g., within one or more layers or other components of the article), in other embodiments. The phosphor particles 630 may be dispersed within substrate 602 or another component, for example but not by way of limitation, by mixing particles 630 into a base material (e.g., paper pulp, plastic base resin, and so on) for the substrate 602 or other component, and/or by impregnating the substrate 602 or other component with a colloidal dispersion of the particles 630. Impregnation may be performed, for example, by a printing, dripping, or spraying process. Phosphor particles 630 may have particle sizes in a range from 1 micron to 20 microns, in an embodiment, although the phosphor particles 630 may be smaller or larger than the above-given range, as well.

In various embodiments, article 600 may be any type of article selected from a group that includes, but is not limited to, an identification card, a driver's license, a passport, identity papers, a banknote, a check, a document, a paper, a stock certificate, a packaging component, a credit card, a bank card, a label, a seal, a postage stamp, a liquid, a human, an animal, and a biological sample. Substrate 602 may be any of various types of substrates, and includes one or more materials selected from a group that includes, but is not limited to, paper, a polymer, glass, a metal, a textile, and a fiber.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the inventive subject matter in any way. Rather, the foregoing detailed description will provide those skilled in the art with a convenient road map for implementing an exemplary embodiment of the invention, it being understood that various changes may be made in the function and arrangement of elements described in an exemplary embodiment without departing from the scope of the invention as set forth in the appended claims and their legal equivalents.

What is claimed is:

1. Luminescent phosphor compositions for security applications, wherein the luminescent phosphor compositions are obtained from different lots of phosphor raw materials, wherein phosphor raw materials from which the respective luminescent phosphor compositions are synthesized have varying impurity amounts and wherein each luminescent phosphor composition comprises:
one or more emitting ions, one or more disturbing ions, optionally one or more sensitizing ions, and a quantity of rare earth impurities other than the one or more emitting ions and the one or more sensitizing ions;
wherein the one or more emitting ions have one or more first decay time constants when the one or more emitting ions are undisturbed, the one or more disturbing ions are different from the one or more emitting ions, and the one or more disturbing ions are included in the luminescent phosphor compositions in a quantity that will cause at least one of the one or more emitting ions to have a pre-defined, target disturbed decay time constant that is greater than zero and less than a corresponding one of the one or more first decay time constants;
wherein the first decay time constant and the target disturbed decay time constants can be distinguished by an authentication device,
wherein the luminescent phosphor compositions have substantially equal target disturbed decay time constants for the corresponding one or more first decay time constants despite the presence of a varying amount of impurity ions therein from the respective phosphor raw materials.

2. The luminescent phosphor compositions of claim 1, wherein the one or more emitting ions include one or more ions of one or more elements selected from a group consisting of chromium, cerium, praseodymium, neodymium, samarium, europium, terbium, dysprosium, holmium, erbium, thulium, and ytterbium.

3. The luminescent phosphor compositions of claim 1, wherein the one or more disturbing ions include one or more ions of one or more elements selected from a group consisting of chromium, manganese, cerium, praseodymium, neodymium, samarium, europium, terbium, dysprosium, holmium, erbium, thulium, ytterbium, iron, cobalt, and nickel.

4. The luminescent phosphor compositions of claim 1, wherein the one or more disturbing ions include one or more ions of one or more elements selected from a group consisting of praseodymium, samarium, europium, terbium, and dysprosium.

5. The luminescent phosphor compositions of claim 1, wherein one or more disturbing ions cause the at least one of the one or more emitting ions to have the target disturbed decay time constant by absorbing energy discharged by the at least one of the one or more emitting ions in transitioning from a storage level to a lower energy level, and by discharging the energy non-radiatively.

6. The luminescent phosphor compositions of claim 1, wherein the luminescent phosphor compositions further comprise:
one or more additional emitting ions, which have one or more additional first decay time constants when the one or more additional emitting ions are undisturbed, wherein the one or more disturbing ions or one or more additional disturbing ions cause at least one of the one or more additional emitting ions to have one or more additional, pre-defined target disturbed decay time constants that are greater than zero and less than corresponding ones of the one or more additional first decay time constants, and wherein the one or more additional, pre-defined target disturbed decay time constants for the corresponding one or more first decay time constants are substantially equal for all of the luminescent phosphor compositions.

7. The luminescent phosphor compositions of claim 1, wherein the luminescent phosphor compositions further comprise:
one or more additional disturbing ions, wherein the one or more disturbing ions or the one or more additional disturbing ions cause at least one of the one or more emitting ions or one or more additional emitting ions, which have one or more additional first decay time constants when the one or more additional emitting ions are undisturbed, to have one or more additional, pre-defined target disturbed decay time constants that are greater than zero and less than corresponding ones of the one or more additional first decay time constants.

8. The luminescent phosphor compositions of claim 1, further comprising a phosphor host crystal lattice material selected from a group consisting of an oxide, a fluoride, an oxysulfide, a halide, a borate, a silicate, a gallate, a phosphate, a vanadate, an oxyhalide, an aluminate, a molybdate, a tungstate, a garnet, or a niobate.

9. A method for producing luminescent phosphor compositions from different lots of phosphor raw materials, wherein the method comprises the steps of:
obtaining a phosphor raw material that includes a phosphor host crystal lattice material, one or more emitting ions, optionally one or more sensitizing ions, and a quantity of rare earth impurities other than the one or more emitting ions and the one or more sensitizing ions, wherein the phosphor raw material is characterized by one or more first decay time constants;
synthesizing a disturbed phosphor composition that includes the phosphor host crystal lattice material, the one or more emitting ions, the quantity of rare earth impurities, and a quantity of one or more disturbing ions;
measuring one or more second decay time constants of the disturbed phosphor composition;
determining whether the one or more second decay time constants are substantially equal to one or more target disturbed decay time constants that are greater than zero and less than corresponding ones of the one or more first decay time constants;
when at least one of the one or more second decay time constants is not substantially equal to the one or more target disturbed decay time constants, repeating the synthesizing, measuring, and determining steps for an additional candidate disturbed phosphor composition that has an adjusted quantity of the one or more disturbing ions that is different from the initial quantity; and synthesizing another disturbed phosphor composition from a different lot of phosphor raw materials than the disturbed phosphor composition, wherein the different lot of phosphor raw materials has a varying impurity level from the impurity level of phosphor raw materials used to synthesize the disturbed phosphor composition, wherein the disturbed phosphor composition and the other disturbed phosphor composition have substantially equal target disturbed decay time constants for the corresponding one or more first decay time constants despite the presence of a varying amount of impurity ions therein from the respective phosphor raw materials.

10. The method of claim 9, wherein repeating the synthesizing step comprises:
increasing the quantity of the one or more disturbing ions when the one or more second decay time constants are greater than the one or more target disturbed decay time constants; and
decreasing the quantity of the one or more disturbing ions when the one or more second decay time constants are less than the one or more target disturbed decay time constants.

11. The method of claim 9, wherein the one or more emitting ions include one or more ions elements selected from a group consisting of chromium, cerium, praseodymium, neodymium, samarium, europium, gadolinium, terbium, dysprosium, holmium, erbium, thulium, and ytterbium.

12. The method of claim 9, wherein the one or more disturbing ions include one or more ions of elements selected from a group consisting of chromium, manganese, cerium, praseodymium, neodymium, samarium, europium, terbium, dysprosium, holmium, erbium, thulium, ytterbium, iron, cobalt, and nickel.

13. Articles comprising:
a substrate; and
an authentication feature on a surface of the substrate or integrated within the substrate, wherein authentication features of different articles comprise different luminescent phosphor compositions obtained from different lots of phosphor raw materials, wherein the phosphor raw materials from which the luminescent phosphor compositions are synthesized have varying impurity levels, and wherein each luminescent phosphor composition comprises:
one or more emitting ions, one or more disturbing ions, optionally one or more sensitizing ions, and a quantity of rare earth impurities other than the one or more emitting ions and the one or more sensitizing ions;
wherein the one or more emitting ions have one or more first decay time constants when the one or more emitting ions are undisturbed, the one or more disturbing ions are different from the one or more emitting ions, and the one or more disturbing ions are included in the phosphor compositions in a quantity that will cause at least one of the one or more emitting ions to have a pre-defined, target disturbed decay time constant that is greater than zero and less than a corresponding one of the one or more first decay time constants;
wherein the first decay time constant and the target disturbed decay time constants can be distinguished by an authentication device, and
wherein the luminescent phosphor compositions all have substantially equal target disturbed decay time constants for the corresponding one or more first decay time constants despite the presence of a varying amount of impurity ions therein from the respective phosphor raw materials.

14. The articles of claim 13, wherein the articles are selected from a group consisting of an identification card, a driver's license, a passport, identity papers, a banknote, a check, a document, a paper, a stock certificate, a packaging component, a credit card, a bank card, a label, a seal, a postage stamp, a liquid, an animal, and a biological sample.

15. The articles of claim 13, wherein the substrate includes one or more materials selected from a group consisting of paper, a polymer, glass, a metal, a textile, and a fiber.

16. The articles of claim 13, wherein the one or more emitting ions include one or more ions elements selected from a group consisting of chromium, cerium, praseodymium, neodymium, samarium, europium, terbium, dysprosium, holmium, erbium, thulium, and ytterbium.

17. The articles of claim 13, wherein the one or more disturbing ions include one or more ions of elements selected from a group consisting of chromium, manganese, cerium, praseodymium, neodymium, samarium, europium, terbium, dysprosium, holmium, erbium, thulium, ytterbium, iron, cobalt, and nickel.

* * * * *